May 9, 1967 N. W. MAPHAM 3,319,147
VARIABLE FREQUENCY, VARIABLE WAVE FORM INVERTER
Original Filed Dec. 31, 1962 2 Sheets-Sheet 1

INVENTOR.
NEVILLE W. MAPHAM
BY Isidore Match
ATTORNEY

INVENTOR.
NEVILLE W. MAPHAM
BY Isidore Match
ATTORNEY

_____

United States Patent Office 3,319,147
Patented May 9, 1967

_____

3,319,147
VARIABLE FREQUENCY, VARIABLE WAVE
FORM INVERTER
Neville W. Mapham, Jordan, N.Y., assignor to General
Electric Company, a corporation of New York
Continuation of application Ser. No. 248,706, Dec. 31,
1962. This application Apr. 20, 1966, Ser. No. 549,749
20 Claims. (Cl. 321—6)

This invention relates to inverters. More particularly, it relates to an improved static inverter and frequency converter circuit.

This application is a full continuation of the application Ser. No. 248,706 entitled, "A Variable Frequency, Variable Wave Form Inverter" filed Dec. 31, 1962.

With the development of static inverters utilizing gate controlled rectifiers as the power switching elements therein, those producing square wave outputs have been the most common form in use in view of the ease with which such square wave power outputs can be produced. However, square waves present the disadvantage of containing a great multiplicity of harmonics which cause heating in many situations such as when they are used with motors, transformers, and the like. Of course, harmonics can be filtered out to provide relatively pure sinusoidal power outputs but filters for accomplishing this purpose are heavy and expensive. Alternatively, sine wave static inverters can be used but, with them, the resonating inductors and capacitors which have to be provided are also heavy and expensive.

In addition to heaviness and expensiveness, known square wave and sine wave inverters both present many problems associated with voltage regulation. In the square wave type inverter, output voltage regulation is generally effected by some form of pulse width modulation. Such modulation requires additional, complex circuitry. Similarly, output voltage regulation of sine wave inverters may require complex voltage sensing arrangements, saturable devices and the like. Also, short-circuit protection and open circuit operation is difficult to obtain with presently known inverter circuits.

Accordingly, it is an important object of this invention to provide an improved static inverter which is substantially both short-circuit and open-circuit proof.

It is a further object to provide an inverter in accordance with the preceding object wherein direct current power to alternating current power conversion is efficient and wherein a substantial saving in weight and cost is effected as compared to known inverters.

It is another object to provide an inverter in accordance with the preceding objects in which output voltage regulation is readily accomplished in a simple manner.

It is still another object to provide an inverter in accordance with the preceding objects which is capable of producing an output, both of whose frequency and output waveform are readily varied.

It is yet another object to provide an inverter in accordance with the preceding objects which is capable of functioning as a D.C. to D.C. converter.

Generally speaking and in accordance with the principles of the invention, there is provided a circuit for converting the output of a potential source to an alternating current output having a chosen range of frequencies comprising first switching means adapted to be coupled to the source to produce an alternating current output having a frequency greater than the highest frequency of the range. There are also provided second switching means and means for applying the output of the first switching means to the second switching means to produce an output having the chosen range of frequencies.

Essentially, a directing conception of the invention is the conversion of a unidirectional potential to a first comparatively "high" frequency alternating current potential and then converting such first alternating current potential to a second relatively "low" frequency alternating current potential, the second alternating current potential having the desired frequency. The invention contemplates the conversion of the potential from a primary potential source which may be a unidirectional or alternating current potential source. If it is an alternating current potential source, the conversion of the output of either a single phase or multiphase output is contemplated. The converting portion of the inventive circuit may be of the series or parallel type and the switching means may comprise circuit elements such as gate controlled rectifiers, transistors, Shockley diodes or other suitable switching elements. The alternating current voltages for effecting the switching of the switching elements from their conductive to their non-conductive states may be square, sinusoidal or other suitable wave configurations.

The inventive circuit may include a suitable filter for converting the outputs of the switching means to a relatively pure sinusoidal form. The timing for changing the switching means elements from one state to the opposite state may be phase controlled or controlled with other suitable arrangements such as by logic circuitry and the like. To provide for output voltage control, feedback may be provided which effects output voltage regulation in accordance with the deviation of the value of the output voltage from a desired value.

Also, in accordance with the principles of the invention in a specific embodiment thereof, there is provided a circuit for converting the output of a unidirectional potential source such as a direct current potential or the rectified output of an alternating current potential source of substantially any frequency to an alternating current power output of a chosen range of frequencies comprising a series arrangement adapted to be connected across the source of a pair of gate controlled rectifiers and an inductor disposed therebetween, a series combination of a pair of capacitors connected across the source, a load impedance in circuit with the junction of the capacitors and an intermediate point on the inductor and a third capacitor in shunt with the load impedance. There are further included in the circuit, first controlling means for preventing the output voltage from exceeding a chosen level and second controlling means for limiting the voltage applied to the gate controlled rectifiers.

Further, in accordance with the invention, there is provided a circuit for converting the output of a unidirectional potential source such as a direct current potential source or the rectified output of an alternating current potential source of a first frequency to an alternating current power output having a second frequency comprising a series arrangement connected across the source of a first pair of gate controlled rectifiers and an inductor disposed therebetween, a series combination of a pair of capacitors connected across the source, and a transformer comprising a primary winding connected between the junction of the capacitors and an intermediate point of the inductor and a plurality of secondary windings. There are further provided a pair of diodes respectively in circuit with the source and the terminals of a first of the secondary windings, the series arrangement connected across the source of a second of the secondary windings and a third diode, and a third capacitor in shunt with the primary winding. A first signal generating means having a frequency substantially greater than the aforesaid second frequency is included for producing gating signals to the first pair of gate controlled rectifiers. The circuit further includes a second pair of gate controlled rectifiers poled in one direction and a third pair of gate controlled rectifiers poled in the opposite direction. A third of the secondary windings is utilized to apply the combined outputs of the gate controlled rectifiers comprising said first pair to a gate controlled rectifier of each of the second and third pairs in the opposite polarity. There are also provided second signal generating means controlled by a signal source having the second frequency, the alternate half cycles of the output of the second signal source controlling pulse trains applied as gating pulses to the second and third pairs of gate controlled rectifiers respectively.

The novel features, which are believed to be characteristic of this invention are set forth with particularity in the appended claims. The invention itself, however, both as to its organization and method of operation, together with further objects and advantages thereof, may best be understood by reference to the following description when taken in connection with the accompanying drawings.

In the drawings, FIG. 1 is a schematic depiction of an illustrative embodiment of a circuit in accordance with the principles of the invention;

Figure 1:
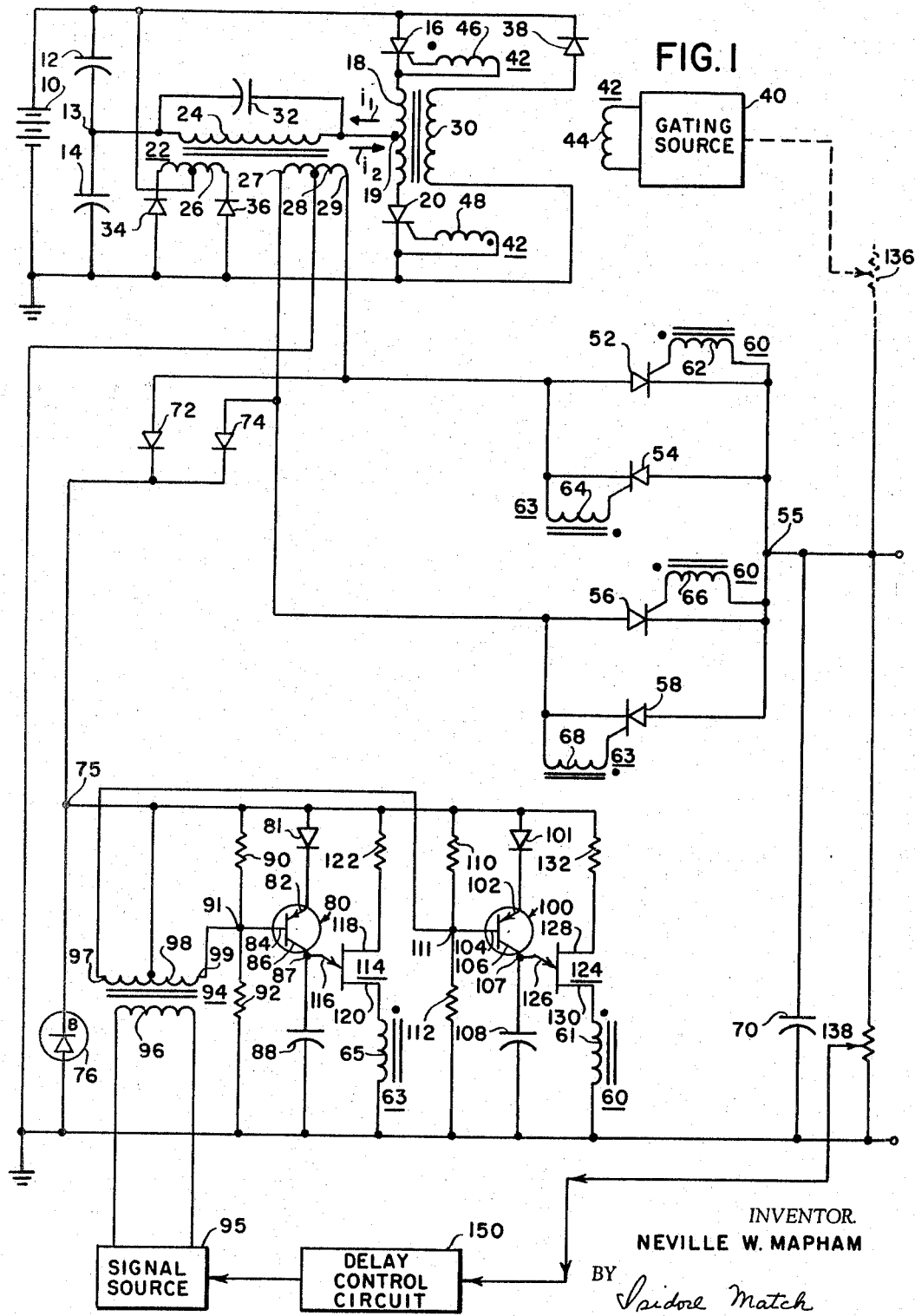

Referring now to FIG. 1, a unidirectional potential source, schematically depicted as a battery 10, the output of which is converted to alternating current power, has connected thereacross the series arrangement of capacitors 12 and 14 and the series arrangement of the anode to cathode path of a silicon controlled rectifier 16, an inductor 18 and the anode to cathode path of a silicon controlled rectifier 20. Connected between the junction 13 of capacitors 12 and 14 and the midpoint of inductor 18 is the parallel arrangement of the primary winding 24 of a transformer 22 and a capacitor 32. The terminals of one secondary winding 26 of transformer 22 are returned to the negative terminal of source 10 through the cathode to anode paths of respective diodes 34 and 36, secondary winding 26 being center-tapped to the positive terminal of source 10. A secondary winding 28 of transformer 22 is utilized in developing the output power of the circuit which is applied to a load as will be further explained hereinbelow.

A winding 30 is included which is in transformer relationship with inductor 18, one terminal of winding 30 being returned to the positive terminal of source 10 through the anode to cathode path of a diode 38, the other terminal of winding 30 being connected to the negative terminal of source 10. Silicon controlled rectifiers 16 and 20 are alternately gated into conductivity by the output of a gating source 40 which may suitably be a pulse generator such as a unijunction transistor relaxation oscillator, a multivibrator or like circuit. Primary winding 44 and secondary windings 46 and 48 are windings of a transformer 42 through which silicon controlled rectifiers 16 and 20 are gated into conductivity by the output of gating source 40. It is seen by the polarity dot designations of secondary windings 46 and 48 that silicon controlled rectifiers 16 and 20 are alternately gated into conductivity.

In considering the operation of the circuit of FIG. 1 as described thus far, when the output from gating source 40 renders silicon controlled rectifier 16 conductive, the current $i_1$ drives the voltage at the anode of silicon controlled rectifier 20 below ground potential thereby reverse biasing silicon controlled rectifier 20. When silicon controlled rectifier 20 is gated into conductivity by the output from gating source 40, the current $i_2$ drives the cathode of silicon controlled rectifier 16 more positive than the voltage from source 10 and thereby reverse biases silicon controlled rectifier 16.

In considering further the operation of this portion of the circuit of FIG. 1, at startup, with junction 13 initially at ground potential, the output of gating source 40 renders silicon controlled rectifier 16 conductive and capacitors 12 and 14 charge to a voltage which is somewhat less than twice the supply voltage thus reverse biasing silicon controlled rectifier 20 so that it reverts to its blocking state. After a time determined by the frequency of the output of gating source 40, silicon controlled rectifier 20 is gated into conductivity and the capacitors discharge through inductor 18 until the voltage at junction 13 falls to a value below ground potential and silicon controlled rectifier 16 is consequently reverse biased. Now, when silicon controlled rectifier 16 is again gated into conductivity, the current in the resonant circuit comprising capacitors 12 and 14 and inductor 18 is higher since the capacitor voltage is now initially below ground potential. At the end of this half cycle, the voltage at junction 13 is therefore higher than it was at the end of the immediately preceding half cycle. This action continues until a steady state condition is reached and maximum and minimum voltages are provided.

The resonant frequency of the described portion of the circuit normally with a load is approximately $$\frac{1}{2\pi\sqrt{LC}}$$

wherein L is the inductance of one half of inductor 18 and C is the sum of the capacitances of capacitors 12 and 14. When no load is present, the aforesaid resonant frequency becomes approximately $$\frac{1}{2\pi\sqrt{LC_1}}$$

wherein L has its previous significance and wherein $C_1$ is the capacitance of capacitor 32 in series with the combination of capacitors 12 and 14. Accordingly, the presence of capacitor 32 permits the circuit to commutate in the absence of a load. In such no load situation, shorter pulses of current flow through primary winding 24 than during conditions of load.

When the output voltage across transformer 22 rises because of an increase in circuit Q, such increase is clipped by diodes 34 and 36. Diodes 34 and 36 return power to source 10 when the output voltage of the circuit rises above a value determined by the turns ratios of the windings of transformer 22.

To limit the voltage across either of silicon controlled rectifiers 16 or 20 in the event of a heavy load or the occurrence of a short circuit, winding 30 is included inductively coupled to center-tapped inductor 18. Thus when the voltage across inductor 18 rises above a value determined by the turns ratios of the windings of transformer 22, diode 38 conducts to limit the voltage.

From the above it is seen that the inclusion of capacitor 32 enables the circuit to commutate with no load and the use of winding 30 coupled to inductor 18 together with diode 38 serves to make the circuit short and open circuit proof.

The alternating current output of the circuit which is developed across secondary winding 28 is applied to silicon controlled rectifiers 52, 54, 56 and 58. In this connection, it is seen that terminal 29 of secondary winding 28 is connected to the anode of silicon controlled rectifier 52 and the cathode of silicon controlled rectifier 54 and that terminal 27 of secondary winding 28 is connected to the anode controlled rectifier 56 and the cathode of silicon controlled rectifier 58.

In the operation of the portion of the circuit comprising secondary winding 28 and silicon controlled rectifiers 52, 54, 56 and 58, silicon controlled rectifiers 52 and 56 have applied to their respective gate electrodes a first pulse train which comprises the pulses produced at the output of transformer 60 during one set of alternately occurring half cycles of output from a gating signal source 95 and silicon controlled rectifiers 54 and 58 have applied to their gate electrodes a second pulse train comprising the pulses produced at the output of transformer 63 during the other set of alternately occurring half cycles of output from the gating signal source 95. In this connection, windings 62 and 66 are secondary windings of a transformer 60 for applying the first pulse train to silicon controlled rectifiers 52 and 56 and windings 64 and 68 are secondary windings of a transformer 63 for applying the second pulse train to silicon controlled rectifiers 54 and 58. The polarity dot designations on the windings comprising a transformer signify common concurrent polarity at their respective dot terminals.

It is seen that silicon controlled rectifier 52 can only be rendered conductive when the voltage at terminal 29 of secondary winding 28 is positive and a gate pulse is applied to the gate electrode of silicon controlled rectifier 52; that silicon controlled rectifier 54 can only be rendered conductive when a gating pulse is applied to its gate electrode and the voltage at terminal 29 is negative; that silicon controlled rectifier 56 can only be rendered conductive when the voltage at terminal 27 of secondary winding 28 is positive and a gating pulse is applied to the gate electrode of silicon controlled rectifier 56; and that silicon controlled rectifier 58 can only be rendered conductive when the voltage at terminal 27 is negative and a gating pulse is applied to the gate electrode of silicon controlled rectifier 58. The frequency of the half cycles from the gating signal source 95 should be appreciably lower than the frequency of the voltage appearing across secondary winding 28.

Figure 2:
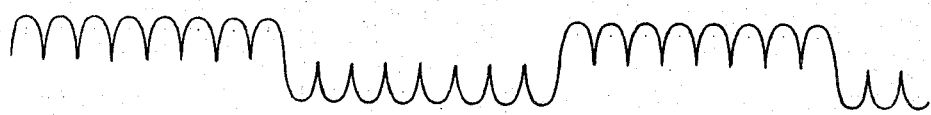
FIGS. 2 to 5 are voltage waveforms of output which are obtainable with the circuit of FIG. 1.
Figure 3:
Figure 4:
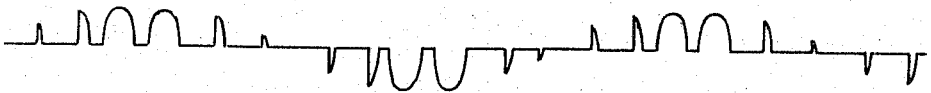
Figure 5:

Thus, considering the first pulse train output of the gating source, during such pulse train, positive gating pulses appear at the gate electrodes of silicon controlled rectifiers 52 and 56 and half cycles of output of positive polarity having twice the frequency of the voltage across secondary winding 28 and which are alternately produced by silicon controlled rectifiers 52 and 56, successively occur at junction 55. During the second pulse train output from the gating source, successively occurring half cycles of negative polarity are produced at junction 55 due to their alternate production by silicon controlled rectifiers 54 and 58. If the gating source signal is a rectangular wave, the output at junction 55 has the configuration as shown in FIG. 2. This output, when filtered by capacitor 70 is a rectangular wave as shown in FIG. 3. If a variable delay is introduced into the time of occurrence of gating pulses, then the output at junction 55 has the configuration shown in FIG. 4 and when filtered by capacitor 70, has the configuration shown in FIG. 5.

Thus with this arrangement, the frequency of the output of the inverter portion of the circuit can be converted to an output of lower frequency and such lower frequency output can have either a rectangular, sinusoidal or any other configuration depending upon the timing of the gating pulses to silicon controlled rectifiers 52, 54, 56 and 58.

The remaining portion of the circuit of FIG. 1 comprises a signal generator for producing the gating pulses for silicon controlled rectifiers 52, 54, 56 and 58. In this circuit, a positive supply voltage is provided by diodes 72 and 74 which full wave rectify the voltage appearing across secondary winding 28 and a breakdown diode 76 which may suitably be a Zener diode acting as a clipper, to which this full wave rectified voltage is applied. The rectified and clipped voltage appearing at the cathode of diode 76 and having a frequency twice that across the secondary winding 28 because of full wave rectification by 72 and 74 is applied as an operating biasing potential to the emitters 82 and 102 of transistors 80 and 100 through the respective anode to cathode paths of reverse voltage protection diodes 81 and 101. In transistor 80, its base 84 is returned to the cathode of diode 76, i.e., junction 75 through a resistor 90 and is connected to ground through a resistor 92. In transistor 100, its base 104 is connected to junction 75 through a resistor 110 and to ground through a resistor 112.

A signal source 95 whose output has the frequency and configuration desired for the circuit output is applied to the primary winding 96 of a transformer 94, one terminal 99 of the secondary winding 98 of transformer 94 being connected to the junction 91 of resistors 90 and 92, the other terminal 97 of secondary winding 98 being connected to the junction 111 of resistors 110 and 112.

The collector 86 of transistor 80 is connected to ground through a capacitor 88, transistor 80 and capacitor 88 comprising the RC timing circuit for firing a unijunction transistor 114 which comprises an emitter 116 connected to the junction 87 of collector 86 and capacitor 88, a first base 118 connected to junction 75 through a resistor 122 and a second base 120 connected to ground through the primary winding 65 of transformer 63. The collector 106 of transistor 100 is connected to ground through a capacitor 108, transistor 100 and capacitor 108 comprising the RC timing circuit for firing a unijunction transistor 124 which comprises an emitter 126 connected to the junction 107 of collector 106 and capacitor 108, a first base 128 connected to junction 75 through a resistor 132 and a second base 130 connected to ground through the primary winding 61 of transformer 60.

In the operation of the signal generator, it is seen that transistor 80 which is normally nonconductive in the quiescent state is rendered conductive when the voltage at terminal 99 of winding 98 goes negative. At such time, capacitor 88 charges toward the potential at junction 75 until emitter 116 attains the voltage necessary to render unijunction transistor 114 conductive whereby a pulse output appears across primary winding 65, and consequently across secondary windings 64 and 68. Transistor 100 is rendered conductive when the voltage at terminal 97 of winding 98 goes negative. At such time, capacitor 108 charges toward the potential at junction 75 until emitter 126 attains the voltage necessary to render unijunction transistor 124 conductive whereby a pulse output appears across primary winding 61 and consequently across secondary windings 62 and 66.

It is seen that with no input applied to primary winding 96 of transformer 94, none of silicon controlled rectifiers 52, 54, 56 and 58 are gated into conductivity and accordingly no output is produced from the circuit. In other words, with no signal input, the delay provided by the RC combination between the rendering of a transistor such as either transistor 80 and 100 conductive and the rendering of its associated unijunction transistor such as either transistor 114 and 124 conductive respectively, exceeds 180° of the cycle. This is because 80 is nonconductive in the absence of a signal input. With a positive going input signal on primary winding 96, the delay, for example, between the rendering of transistor 80 and consequently unijunction transistor 114 conductive is decreased and, at a given threshold level of conductivity in transistor 80, is at least less than 180° since capacitor 88 charges to the firing voltage for unijunction transistor 114 more quickly. Thus, an increase in the amplitude of a positive going signal on primary winding 96 decreases the delay angle between the rendering conductive of a transistor and the firing of its associated unijunction transistor and a decrease in such amplitude increases the delay angle. Correspondingly, the extent of the delay between the rendering conductive of a transistor and its associated unijunction transistor varies inversely with the amplitude of a signal appearing on primary winding 96. In the circuit of FIG. 1, there are included means for providing automatic voltage regulation of the output voltage.

Figure 6:
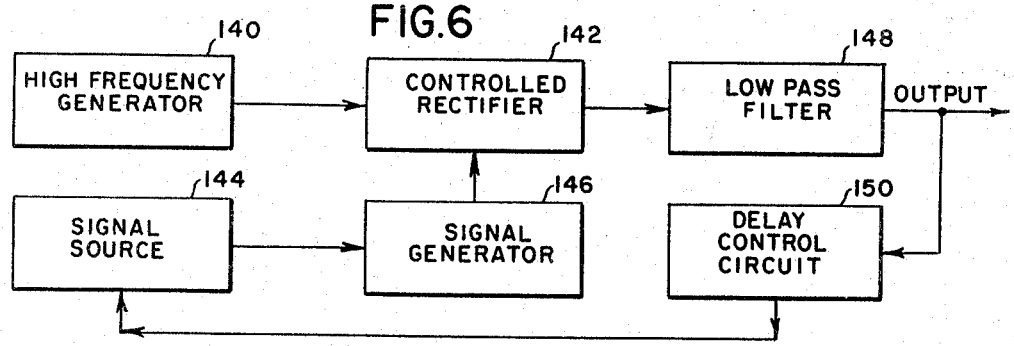
FIG. 6 is an embodiment of an arrangement in accordance with the principles of the invention which functions as a linear amplifier.

In the block diagram of FIG. 6, high frequency generator stage 140 corresponds to the inverter portion of the circuit of FIG. 1 which includes silicon controlled rectifiers 16 and 20 and their associated circuit components, controlled rectifier stage 142 corresponds to the portion of the circuit which includes silicon controlled rectifiers 52, 54, 56 and 58 and their associated circuit components, input signal source 144 includes signal source 95 and transformer 94, signal generator 146 corresponds to the portion of the circuit of FIG. 1 which comprises transistors 80 and 100 and unijunction transistors 114 and 124 and their associated circuit components, and low pass filter stage 148 corresponds to capacitor 70. The delay control circuit 150 may suitably be a reference voltage source wherein a voltage is provided that is proportional to the desired output voltage. Such reference voltage can be applied to influence the driving voltage to the active devices in signal source 144. Thus, if the active devices in signal source 144 are transistors, the voltage appearing at the tapped point on a variable resistor 138 (FIG. 1) can be included in a reference bridge network in signal source 95, the reference bridge being so poled that if the output voltage falls below a desired level, the output of the bridge increases the base drive to these transistors and increases commensurately the amplitude of the output of signal source 95; and if the output voltage rises above the desired level, then the output of the aforementioned bridge is such as to decrease the base drive to the transistors in signal source 95 and thereby commensurately decrease the amplitude of its output. Since such reference bridge networks are well known in the art, no further detailed description thereof is deemed necessary.

Figure 7:
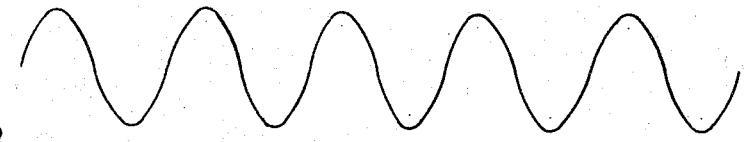
FIGS. 7 and 8 are waveforms of outputs obtainable with the arrangement of FIG. 6.
Figure 8:
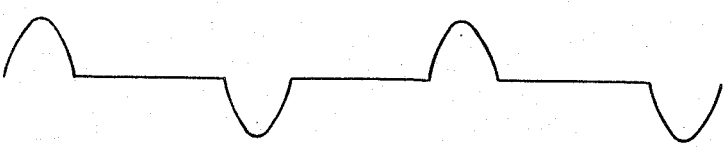

It is to be realized that in the circuit of FIG. 1, when it is used as an inverter, the output voltage therefrom can also be controlled by varying the frequency produced across transformer 22. Also, the pulse widths of the output of the inverter can be influenced by the selection of the values of L and C. Thus, a relatively pure sinusoidal output having the wave shape shown in FIG. 7 can be produced, the frequency thereof being the same as the frequency of gating signals applied to the gate electrodes of silicon controlled rectifiers 16 and 20 or a quasi-sinusoidal output having a lesser frequency can be produced such as shown in FIG. 8. The pulse widths in these examples are determined by the values selected for L and C. In this connection, it is readily appreciated that the output power of the circuit of FIG. 1 decreases proportionately with a decrease in the frequency of the gating signals applied to the gate electrodes of silicon controlled rectifiers 16 and 20. Thus the output voltage of the circuit can also be regulated by sensing the output voltage by means of a variable resistor 136, instead of by using resistor 138 and stage 150. For example, gating source 40 in this situation could be a magnetic coupled multivibrator whose output amplitude is constant within given limits of its supply voltage and whose frequency depends upon such supply voltage. The sensed output voltage taken from resistor 136 could be included in a reference bridge network in stage 40, such bridge arrangement being poled whereby an output voltage greater than desired would cause a decrease in the supply voltage for the gating source and an output voltage less than the desired voltage would cause an increase in the supply voltage for the gating source.

The circuit of FIG. 1 can be made to function as a D.C. to D.C. converter. In such situation only silicon controlled rectifiers 52 and 56 would be utilized. In this situation, there would appear at junction 55, the full wave rectified voltage from secondary winding 28 and such voltage would be filtered in capacitor 70 to produce a relatively continuous unidirectional output.

While there have been shown particular embodiments of this invention, it will, of course, be understood that it is not wished to be limited thereto since different modifications may be made both in the circuit arrangements and in the instrumentalities employed, and it is contemplated in the appended claims to cover any such modifications as fall within the true spirit and scope of the invention.

What is claimed as new and desired to be secured by Letters Patent of the United States is:

1. An arrangement for producing an alternating wave having a desired frequency comprising a source of unidirectional potential, a self-commutating, gate controlled rectifier means, a first source of recurrent gating signals, a first output circuit, said rectifier means responsive to said potential and said first signals to become conductive and produce a first alternating wave in said first output circuit having a frequency substantially higher than said desired frequency, said first siganls gating said rectifier means recurrently into conduction after said rectifier means becomes nonconducting due to its self-commutating action, the recurrence rate of said first signals thereby controlling the nonconducing to conducting time of said rectifier means, means for full wave rectifying said first wave a second source of recurrent gating signals, a second output circuit, a frequency converting, gate controlled rectifier means, said frequency converting means responsive to said first alternating wave, said full wave rectified first wave and said second signals to become conductive and produce a second alternating wave in said second output circuit having said desired frequency.

2. An arrangement for producing an alternating wave having a desired frequency comprising a source of unidirectional potential, a self-commutating, gate controlled rectifier means, a first source of gating signals having a first frequency which is substantially higher than said desired frequency, a first output circuit, said rectifier means responsive to said potential and said first signals to become conductive and produce a first alternating wave in said first output circuit having said first frequency, said first signals gating said rectifier means periodically into conduction after said rectifier means becomes nonconducting due to its self-commutating action, the frequency of said first signals thereby controlling the nonconducting to conducting periods of said rectifier means, means for full wave rectifying said first wave, a second source of gating signals having said desired frequency, a second output circuit, a frequency converting, gate controlled rectifier means, said frequency converting means responsive to said first alternating wave, said full wave rectified first wave and said second signals to become conductive and produce a second alternating wave in said second output circuit having said desired frequency and including components of said first frequency, a first frequency filter for removing said second frequency from said last named wave to provide said desired frequency wave.

3. An arrangement according to claim 2 further comprising means responsive to a departure of the amplitude of said desired frequency wave from a given amplitude for deriving a corrective signal, said frequency converting, gate controlled rectifier means responsive to said corrective signal to change the amplitude of said desired frequency wave to said given amplitude.

4. A circuit for converting the output of a source of unidirectional potential to an alternating potential having a desired frequency comprising an inverter circuit, a switching circuit, sources of first frequency and second frequency control signals, the frequency of said first frequency signal being higher than said desired frequency, said second frequency signal having a frequency twice that of said first frequency, a source of desired frequency signals, said inverter circuit responsive to said undirectional potential and said first frequency signal to produce alternating potential output having said first frequency, said switching circuit responsive to said last named output and to said second frequency and said desired frequency signals to full wave rectify said first frequency alternating potential output to produce said alternating potential having said desired frequency.

5. A circuit for converting the output of a source of unidirectional potential to an alternating potential having a desired frequency comprising an inverter circuit having a first output circuit, sources of first frequency and second frequency control pulses, a source of a desired frequency wave, said first frequency being higher than said desired frequency, said second frequency pulses having a frequency related to said first frequency, means for varying the time of occurrence of said second pulses in accordance with a characteristic of said desired frequency wave, said inverter circuit responsive to said unidirectional potential and said first frequency pulses to produce an alternating potential output in said first output circuit having said first frequency, a second output circuit, at least one bidirectional switching device connected in series between said second output circuit and said first output circuit, said switching device responsive to said varied second frequency pulses to switch selected trains of positive and negative polarity half cycles of said alternating potential in a given sequence from said first output circuit into said second output circuit to produce said alternating potential having said desired frequency.

6. An arrangement according to claim 5 wherein said second frequency is double said first frequency and said source of a desired wave comprises a source of alternating waves having said desired frequency and a given amplitude characteristic, said varying means responsive to said alternating waves and said second frequency pulses to produce trigger pulses having a time of occurrence corresponding to the instantaneous amplitude of said wave and occurring at double said first frequency, and means for controlling said switching of said switching devices in accordance with the time of occurrence of said last named trigger pulses.

7. A circuit for converting the output of a uni-directional potential source to an alternating current power output having a given frequency comprising input terminals for applying said potential source output to said circuit, a series arrangement connected across said input terminals of a first pair of gate controlled rectifiers and a first inductor disposed therebetween, a series combination of a pair of capacitors connected across said input terminals, an output circuit connected between the junction of said capacitors and an intermediate point on said inductor, a third capacitor in shunt with said output circuit, first signal generating means having a first frequency, means for applying the output of said first signal generating means as gating signals to the first and second gate controlled rectifiers of said first pair of rectifiers to produce an alternating output in said output circuit, a second pair of gate controlled rectifiers poled in one direction, a third pair of gate controlled rectifiers poled in the opposite direction, a load circuit, means for applying said alternating output in one polarity to a gate controlled rectifier of each of said second and third pairs and in the opposite polarity to the other gate controlled rectifier of each of said second and third pairs, a source of second signals, means for applying said second signals as gating signals to each of the gate controlled rectifiers of said second and third pair of rectifiers to switch selected trains of positive and negative polarity half cycles of said alternating output in a given sequence from said output circuit to said load circuit to provide said given frequency alternating current power.

8. A circuit as defined in claim 7 and further including first controlling means coupled between said output circuit and said input terminals for preventing said developed output voltage from exceeding a chosen level.

9. A circuit as defined in claim 8 wherein said output circuit comprises a transformer having a primary winding and a plurality of secondary windings and wherein said first controlling means comprises a pair of diodes coupled between one of said input terminals and the respective terminals of a first of said secondary windings, and wherein said means for applying the alternating output of said output circuit means to said second and third pairs of gate controlled rectifiers is a second of said secondary windings.

10. The combination defined in claim 9 wherein said second signal generating means is a unijunction transistor relaxation oscillator having an RC combination for determining the time of rendering conductive of the unijunction transistor therein and further including means for combining the outputs of said second pair of gate controlled rectifiers, and means for feeding back a portion of said combined output, said fedback portion causing the rendering conductive time of said unijunction transistor to be advanced when said combined output voltage is less than a chosen value and causing the rendering conductive time of said unijunction transistor to be retarded when said output voltage exceeds said chosen value.

11. The combination defined in claim 10 wherein said first signal generating means is an oscillator which provides an output frequency proportional to the voltage supplied thereto and further including means for combining the outputs of said second pair of gate controlled rectifiers, means for feeding back a portion of said combined outputs to said first signal generating means, and means responsive to said fedback portion for increasing the output frequency of said first signal generating means when said combined output voltage is less than a chosen voltage and for decreasing the output frequency of said first signal generating means when said combined output voltage exceeds said chosen voltage.

12. A circuit as defined in claim 9 and further including second controlling means coupled between said second input terminals and said inductor for limiting the voltage applied to said first pair of gate controlled rectifiers.

13. A circuit as defined in claim 12 wherein said second controlling means comprises the series arrangement coupled across said input terminals of a second inductor coupled to said first inductor and a third diode.

14. A circuit for converting the output of a unidirectional potential source to an alternating current power output having a given frequency comprising a series arrangement connected across said source of a first pair of gate controlled rectifiers and a first inductor disposed therebetween, a series combination of a pair of capacitors connected across said source, a transformer comprising a primary winding connected between the junction of said capacitors and an intermediate point on said first inductor and a plurality of secondary windings, a pair of diodes respectively in circuit with said source and the terminals of a first of said secondary windings, the series arrangement connected across said source of a second inductor coupled to said first inductor and a third diode, a third capacitor in shunt with said primary winding, first signal generating means having a frequency substantially greater than said chosen frequency, means for applying the output of said first signal generating means as first gating signals to said first pair of gate controlled rectifiers, a second pair of gate controlled rectifiers poled in one direction, a third pair of gate controlled rectifiers poled in the opposite direction, a second of said secondary windings for applying the combined outputs of the gate controlled rectifiers comprising said first pair to a gate controlled rectifier of each of said second and third pairs in one polarity and to the other gate controlled rectifier of each of said second and third pairs in the opposite polarity, second signal generating means having said chosen frequency, means for applying alternate half cycles of the output of said second signal generating means as second gating signals to said second and third pairs of gate controlled rectifiers respectively, means for combining the outputs of said second and third pairs of gate controlled rectifiers, and means for feeding back a portion of said combined outputs to said second signal generating means, the time of production of said second gating signals being retarded when the voltage of said combined outputs exceed a chosen voltage, the time of production of said second gating signals being advanced when the voltage of said combined outputs is less than said chosen voltage.

15. A circuit as defined in claim 14 wherein said second signal generating means is a unijunction transistor relaxation oscillator having an RC combination for determining the time of rendering conductive of the unijunction transistor and wherein said feedback portion affects said time in accordance with the value of said combined outputs.

16. A circuit for converting the output of a unidirectional potential source to an alternating current power output having a given frequency comprising a series arrangement connected across said source of a first pair of gate controlled rectifiers and a first inductor disposed therebetween, a series combination of a pair of capacitors connected across said source, a transformer comprising a primary winding connected between the junction of said capacitors and an intermediate point of said inductor and a plurality of secondary windings, a pair of diodes respectively in circuit with said source and the terminals of a first of said secondary windings, the series arrangement connected across said source of a second inductor coupled to said first inductor and a third diode, a third capacitor in shunt with said primary winding, first signal generating means having a frequency substantially greater than said chosen frequency, means for applying the output of said first signal generating means as gating signals to said first pair of gate controlled rectifiers, a second pair of gate controlled rectifiers poled in one direction, a third pair of gate controlled rectifiers poled in the opposite direction, a second of said secondary windings for applying the combined outputs of the gate controlled rectifiers comprising said first pair to a gate controlled rectifier of each of said second and third pairs in one polarity and to the other gate controlled rectifier of each of said second and third pairs in the opposite polarity, second signal generating means having said chosen frequency, and means responsive to alternate half cycles of the output of said second signal generating means to provide gating signals to said second and third pairs of gate controlled rectifiers respectively.

17. A circuit as defined in claim 18 wherein said first signal generating means is an oscillator which provides an output having a frequency proportional to the voltage supplied thereto and further including means for combining the outputs of said second and third pairs of gate controlled rectifiers, means for feeding back a portion of said combined outputs to said first signal generating means and means responsive to said fedback portion for increasing the output frequency of said first signal generating means when the voltage of said combined outputs is less than a chosen voltage and for decreasing the output frequency of said first signal generating means when the voltage of said combined outputs exceeds said chosen voltage.

18. In combination with a unidirectional potential source, a D.C. to A.C. converter comprising a series arrangement connected across said source of a first pair of gate controlled rectifiers and a first inductor disposed therebetween, a series combination of a pair of capacitors connected across said source, a transformer comprising a primary winding connected between the junction of said capacitors and an intermediate point of said first inductor and a plurality of secondary windings, a pair of diodes respectively in circuit with said source and the terminals of a first of said secondary windings, the series arrangement connected across said source of a second inductor coupled to said first inductor and a third capacitor in shunt with said primary winding, first signal means generating means having a first output frequency, means for applying the output of said first signal generating means as gating signals to said first pair of gate controlled rectifiers, a second pair of similarly poled gate controlled rectifiers, a second of said secondary windings for applying the combined outputs of the gate controlled rectifiers comprising said first pair to each of the gate controlled rectifiers comprising said second pair in opposite polarities respectively, second signal generating means having a second frequency substantially less than said first frequency, and means responsive to alternate half cycles of the output of said second signal generating means to provide gating signals to each of said second pair of gate controlled rectifiers respectively.

19. A circuit for converting the output of an alternating current power source to an alternating current power output having a selectively variable waveshape and a frequency substantially less than the frequency of said source output comprising a first pair of gate controlled rectifiers poled in one direction, a second pair of gate controlled rectifiers poled in the opposite direction, means for applying the output of said source in one polarity to a gate controlled rectifier of each pair and in the opposite polarity to the other gate controlled rectifier of each pair, signal generating means having said lesser frequency and means responsive to alternate half cycles of the output of said last named means to supply gating signals to said first and second pairs of gate controlled rectifiers respectively comprising means for selectively varying the time of application of said last mentioned gating signals.

20. A circuit for converting the output of unidirectional potential source to an alternating current power output having a given waveshape and frequency comprising input terminals for applying said potential source output to said circuit, a series arrangement connected across said input terminals of a first pair of gate controlled rectifiers and an inductor disposed therebetween, a series combination of a pair of capacitors connected across said source, means for developing an output connected between the junction of said capacitors and said inductor, a third capacitor in shunt with said output developing first signal generating means having a first frequency, means for applying the output of said last named means as gating signals to said first pair of gate controlled rectifiers, first gate controlled rectifying means poled in one direction, second gate controlled rectifying means poled in the opposite direction, means for applying the output from said output developing means in opposite polarities to said first and second gate controlled rectifying means respectively, second signal generating means having an output frequency substantially less than the frequency of the output of said first signal generating means, means responsive to alternate half cycles of the output of said second signal generating means to supply gating signals to said first and second gate controlled rectifying means respectively comprising means for selectively varying the time of application of said last mentioned gating signals in accordance with said given output waveshape.

References Cited by the Examiner

UNITED STATES PATENTS 3,131,343 4/1964 Reinert _____ 321—45 X
3,246,231 4/1966 Clarke _____ 321—69

OTHER REFERENCES

G.E. Silicon Controlled Rectifier Manual, Second Edition, 1961, pp. 89 and 90.

JOHN F. COUCH, *Primary Examiner.*

W. H. BEHA, *Assistant Examiner.*